(12) United States Patent
Noh et al.

(10) Patent No.: US 9,139,725 B2
(45) Date of Patent: Sep. 22, 2015

(54) POLYPROPYLENE RESIN COMPOSITION FOR INTERIOR MATERIALS OF AUTOMOBILE WITH ADVANCED PAINT ADHESIVITY AND LOW SPECIFIC GRAVITY

(71) Applicants: Hyundai Motor Company, Seoul (KR); Kia Motors Corporation, Seoul (KR); Daeha Co., Ltd., Dangjin, Chungnam (KR)

(72) Inventors: Jung Gyun Noh, Gyeonggi-do (KR); Kyeong Hoon Jang, Seoul (KR); Hak Soo Kim, Seoul (KR); Han Ki Lee, Gyeonggi-do (KR); Kyung Beom Seo, Chungcheongnam-do (KR); Han Pyol Kim, Daejeon (KR); Im Taek Sung, Incheon (KR)

(73) Assignees: Hyundai Motor Company, Seoul (KR); Kia Motor Corporation, Seoul (KR); Daeha Co., Ltd., Dangjin, Chungnam (KR)

( * ) Notice: Subject to any disclaimer, the term of this patent is extended or adjusted under 35 U.S.C. 154(b) by 175 days.

(21) Appl. No.: 13/898,750

(22) Filed: May 21, 2013

(65) Prior Publication Data
US 2014/0135440 A1   May 15, 2014

(30) Foreign Application Priority Data
Nov. 9, 2012 (KR) .................. 10-2012-0126840

(51) Int. Cl.
*C08L 23/14* (2006.01)

(52) U.S. Cl.
CPC ..................... *C08L 23/14* (2013.01)

(58) Field of Classification Search
CPC ........................................................ C08L 23/14
USPC ......................................................... 524/451
See application file for complete search history.

(56) References Cited

U.S. PATENT DOCUMENTS 7,375,162 B2 * 5/2008 Strebel et al. ................. 525/240

FOREIGN PATENT DOCUMENTS

| JP | 2004-091701 | 3/2004 |
| JP | 2005-105056 A | 4/2005 |

(Continued)

OTHER PUBLICATIONS

English Translation of JP2005-105056 obtained Dec. 2, 2014 at http://www19.ipdl.inpit.go.jp/PA1/INDEX.*

*Primary Examiner* — Ling Choi
*Assistant Examiner* — Lanee Reuther
(74) *Attorney, Agent, or Firm* — Mintz Levin Cohn Ferris Glovsky and Popeo, P.C.; Peter F. Corless

(57) ABSTRACT

Disclosed is a polypropylene resin composition for automobile interior trim parts with superior paint adhesivity and low specific gravity. More specifically, a polypropylene resin composition for automobile interior trim parts having superior paint adhesivity and low specific gravity is disclosed, wherein a base resin including polypropylene, a propylene-ethylene copolymer or a mixture thereof is mixed with a reinforcer including magnesium hydroxide and an ethylene-butene elastomer. The present polypropylene resin composition allows for direct painting of an automobile interior trim part surface without primer treatment and provides excellent resistance to damage caused by impact.

9 Claims, 1 Drawing Sheet

(56) References Cited

FOREIGN PATENT DOCUMENTS

| | | | |
|---|---|---|---|
| JP | 2005105056 A | * | 4/2005 |
| JP | 2009-149847 | | 7/2009 |
| JP | 2011088997 | | 5/2011 |
| KR | 10-2009-0054346 A | | 5/2009 |

* cited by examiner

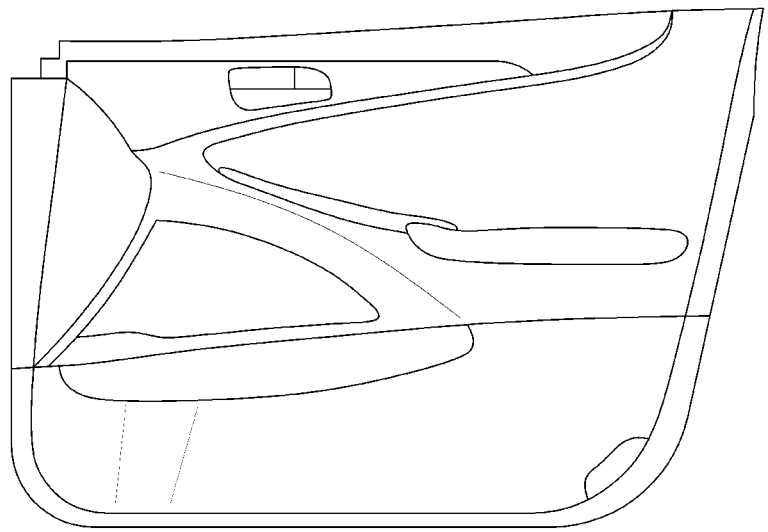

POLYPROPYLENE RESIN COMPOSITION FOR INTERIOR MATERIALS OF AUTOMOBILE WITH ADVANCED PAINT ADHESIVITY AND LOW SPECIFIC GRAVITY

CROSS-REFERENCE TO RELATED APPLICATIONS

This application claims priority under 35 U.S.C. §119 to Korean Patent Application No. 10-2012-0126840, filed on Nov. 9, 2012 in the Korean Intellectual Property Office, the disclosure of which is incorporated herein by reference in its entirety.

BACKGROUND (a) Technical Field

The present invention relates to a polypropylene resin composition for automobile interior trim parts with superior paint adhesivity and low specific gravity.

(b) Background Art

Materials for automobile interior parts, such as instrument panels and door trim panels, should have superior paint adhesivity and impact resistance in order to satisfy vehicle collision standards. A mixture of polycarbonate and acrylonitrile-butadiene-styrene copolymer, which has a polar structure that provides superior paint adhesivity and impact resistance, is widely used. However, the resin is very expensive and has a high specific gravity. Thus, a lot of efforts in the automobile industry are focused on developing an alternative material with low specific gravity.

As one alternative, a polyolefin-based thermoplastic resin, particularly a polypropylene-based resin, is frequently used. However, since the polypropylene-based resin consists of semicrystalline polypropylene and lacks polar or reactive groups, it cannot form a strong polar bond or hydrogen bond with polar molecules included in paints. Therefore, it demonstrates poor impact resistance and paint adhesivity.

Recently, ethylene-α-copolymer rubber has been blended with the polypropylene-based resin to improve impact resistance. Further, primer treatment is performed before painting to improve the adherence of the paint to the surface.

In particular, the primer treatment is carried out to modify the surface before painting the polypropylene-based resin. For example, coating of a chlorinated polypropylene (CPP) primer, flame treatment, corona treatment, plasma treatment, ion or electron beam treatment, etc. are employed after injection molding of the parts. Among these methods, CPP primer treatment is the most widely used because it provides superior paint adhesivity and productivity. However, the surface treatment by CPP primer treatment before painting has problems associated with increased cost, environmental concern of the chlorine components contained in the CPP primer, removal of the primer for recycling, and the like.

Accordingly, efforts have been made to develop a low-specific-gravity polypropylene-based resin that can be used for automobile interior parts, which has superior physical properties and exhibits superior paint adhesivity without primer treatment.

Many methods for improving physical properties and paint adhesivity of polypropylene have been proposed. A representative example is addition of an olefin copolymer rubber, an olefin-based oligomer having hydroxyl groups, an olefin-acrylate copolymer, a glycidyl methacrylate copolymer, etc. to polypropylene resin in order to polarize the resin and improve its reactivity and adhesivity with paints.

As for automobiles interior materials using polypropylene, Korean Patent No. 957303 describes a polypropylene resin composition including an ethylene-propylene block copolymer, an ethylene-α-olefin copolymer rubber, a styrene-based polymer rubber, a polypropylene-silicone rubber masterbatch, a magnesium compound and an inorganic filler.

U.S. Pat. No. 7,375,162 describes a propylene polymer composition including a propylene-ethylene copolymer base resin, an inorganic filler such as magnesium hydroxide and an ethylene-butene-1 copolymer plastomer.

Japanese Patent Publication No. 2011-0088997 describes a composite material including an olefin-based rubber such as block polypropylene, ethylene-butene copolymer, etc. and an alkaline compound such as magnesium hydroxide.

However, the above-described technologies are problematic in that reproducibility is not good, paint adhesivity is insufficient and impact resistance is not satisfactory to meet the strict vehicle collision standards.

Accordingly, development of a polypropylene-based resin composition having improved impact resistance and paint adhesivity is needed.

SUMMARY

The inventors of the present invention have discovered that superior paint adhesivity and impact resistance may be achieved by mixing a base resin including polypropylene, a propylene-ethylene copolymer, or a mixture thereof with a reinforcer including magnesium hydroxide and an ethylene-butene elastomer.

According to one embodiment, the present invention provides a polypropylene resin composition for automobile interior trim parts exhibiting superior reactivity and adhesivity with paints. In particular, the present invention provides a polypropylene resin composition exhibiting superior reactivity and adhesivity with paints without primer treatment. The present invention further provides an automobile interior trim part fabricated using the polypropylene resin composition for automobile interior trim parts.

In an aspect, the present invention provides a polypropylene resin composition for automobile interior trim parts, including: about 40-70 wt % of a base resin selected from a group consisting of polypropylene, a propylene-ethylene copolymer and a mixture thereof; about 10-18 wt % of a reinforcer, particularly a reinforcer including magnesium hydroxide; and about 20-42 wt % of an elastomeric material, particularly ethylene-butene elastomer, wherein wt % are based on the total weight of the polypropylene resin composition.

In another aspect, the present invention provides an automobile interior trim part fabricated using the polypropylene resin composition for automobile interior trim parts.

Since the polypropylene resin composition for automobile interior trim parts according to the present invention has improved paint adhesivity, automobile interior trim parts may be painted without primer treatment.

Since the automobile interior trim part thus fabricated has improved impact resistance, it has excellent resistance to damage caused by impact. Further, due to excellent rigidity and low specific gravity provided by the polypropylene resin composition, the weight of the automobile interior trim part can be reduced.

Other features and aspects of the present invention will be apparent from the following detailed description, drawings and claims.

BRIEF DESCRIPTION OF THE DRAWING

The above and other objects, features and advantages of the present invention will now be described in detail with reference to certain exemplary embodiments thereof illustrated in the accompanying drawing which is given hereinbelow by way of illustration only, and thus are not limitative of the invention, and wherein:

FIG. 1 shows an exemplary door trim according to an embodiment of the present invention.

DESCRIPTION OF EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a polypropylene resin composition for automobile interior trim parts, including:

about 40-70 wt %, based on the total weight of the polypropylene resin composition, of a base resin selected from the group consisting of polypropylene, a propylene-ethylene copolymer and a mixture thereof;

about 10-18 wt %, based on the total weight of the polypropylene resin composition, of a reinforcer, particularly a reinforcer including magnesium hydroxide; and about 20-42 wt %, based on the total weight of the polypropylene resin composition, of an elastomer, particularly an ethylene-butene elastomer.

In an exemplary embodiment of the present invention, the automobile interior trim parts refer to any interior parts used in an automobile, including but not limited to a pillar, door trim, console, crash pad, steering wheel, frame or support of the instrument panel, and so forth.

In an exemplary embodiment of the present invention, the polypropylene is a main constituent of the polypropylene resin composition for automobile interior trim parts, and is highly crystalline with an isotactic index of at least 97%.

As used herein, the isotactic index refers to an index of stereoregularity of arrangement along the main chain of a polymer when stereoisomers are present. A higher isotactic index means an arrangement that is along the same direction.

In an exemplary embodiment of the present invention, the polypropylene has a melt index of about 10-60 g/10 min (as measured at 230° C. using a 2.16 kg weight). If the melt index is below about 10 g/10 min, moldability is poor because it becomes difficult to fill the composition into a mold during injection molding. On the other hand, if the melt index exceeds about 60 g/10 min, the polypropylene resin composition is not suitable for automobile interior parts because of decreased impact resistance.

In an exemplary embodiment of the present invention, the base resin includes a propylene-ethylene copolymer having an ethylene content of about 2-14 wt %, based on the total weight of the propylene-ethylene copolymer.

In an exemplary embodiment of the present invention, the content of the base resin is about 40-70 wt %. If the content of the base resin is less than about 40 wt %, rigidity may be insufficient. And, if it exceeds about 70 wt %, impact resistance decreases owing to the decreased content of rubber. As a result, the properties of the composition are inadequate for automobile interior trim parts. Further, the paint may not penetrate into interior trim parts, and may be detached from the surface of the parts.

In an exemplary embodiment of the present invention, the reinforcer has an average length of about 1-4 μm and an average thickness of about 0.03-0.1 μm. In particular, the reinforcer, which may be magnesium hydroxide, is generally in the form of particles and typically has an average particle size of generally about 1-4 μm. The particles may be generally spherical or may have irregular or elongate shapes such that, for example, a length and width thereof may differ and may vary.

If the average length is smaller than about 1 μm or if the average thickness is smaller than about 0.03 μm, dispersibility may be decrease due to small particle size. On the other hand, if the average length is larger than 4 μm or if the average thickness is larger than 0.1 μm, impact properties may be unsatisfactory for automobile interior trim parts.

In an exemplary embodiment of the present invention, the reinforcer has a disk-shaped lamellar structure. The lamellar structure is a structure well-known in the art and generally refers to a stereostructure formed by layers. According to an exemplary embodiment, the reinforcer including the magnesium hydroxide is not present in a single layer but is instead uniformly dispersed in the base resin.

In an exemplary embodiment of the present invention, the content of the reinforcer is about 10-18 wt % based on the entire weight of the composition. If the content is less than about 10 wt %, impact resistance decreases greatly due to insufficient rigidity. On the other hand, if the content of the reinforcer exceeds about 18 wt %, rigidity is improved but specific gravity also increases, which makes it difficult to provide lightweight automobile interior trim parts.

In an exemplary embodiment of the present invention, the reinforcer further comprises talc. The weight ratio of the magnesium hydroxide to the talc may be about 50-70 wt % (magnesium hydroxide) to about 30-50 wt % (talc). If the proportion of talc is above this range, rigidity and impact resistance may be unsatisfactory for automobile interior trim parts.

In an exemplary embodiment of the present invention, the ethylene-butene elastomer provides improved impact resistance and paintability of the polypropylene resin composition for automobile interior trim parts. According to various embodiments, the ethylene-butene elastomer may have a melt index of about 0.5-20 g/10 min (at 190° C., 2.16 kg). If the melt index is below about 0.5 g/10 min, rigidity may decrease. On the other hand, if the melt index exceeds about 20 g/10 min, impact resistance may decrease.

In an exemplary embodiment of the present invention, the content of the ethylene-butene elastomer is about 20-42 wt % based on total weight of the polypropylene resin composition. If the content of ethylene-butene elastomer is less than about 20 wt %, paintability may be unsatisfactory and impact resistance may be insufficient to meet the vehicle collision standard. On the other hand, if the ethylene-butene elastomer content exceeds about 42 wt %, paintability is improved but other physical properties, such as rigidity, may be unsatisfactory.

The present invention also provides an automobile interior trim part fabricated using the polypropylene resin composition for automobile interior trim parts.

Since the polypropylene resin composition for automobile interior trim parts according to the present invention has improved paint adhesivity, painting of the parts can be accomplished without primer treatment. Since the automobile interior trim part fabricated using the present polypropylene resin composition has improved impact resistance, it provides excellent resistance to damage caused by impact. Further, due to excellent rigidity and low specific gravity of the present polypropylene resin composition, the weight of the automobile interior trim part can be reduced.

EXAMPLES

The present invention will be described in more detail through examples. The following examples are for illustrative purposes only and it will be apparent to those skilled in the art not that the scope of this invention is not limited by the examples.

Example 1

To a base resin including 13 wt % of highly crystalline polypropylene (homo PP) and 49.2 wt % of a highly crystalline ethylene-propylene copolymer (HCPP) with an ethylene content of 10%, 23 wt % of an ethylene-butene elastomer (EBR), 14 wt % of magnesium hydroxide and 0.8 wt % of an antioxidant were added. By mixing at room temperature (23° C.) for 5 minutes, a polypropylene resin composition was prepared. The polypropylene resin composition was dry blended and extruded using a twin screw extruder (SM, diameter Φ45) set at 200° C. to prepare pellets. The pellets were injection molded into a test sample for measurement of physical properties and a 3-mm thick sheet using an injection molding machine (LG, clamping force: 140 ton) set at 210° C.

Examples 2-4

Preparation was carried out in the same manner as in Example 1 and as described in Table 1.

Comparative Examples 1-6

Preparation was carried out in the same manner as in Example 1 and as described in Table 1.

TABLE 1

| | Examples | | | | Comparative Examples | | | | | |
|---|---|---|---|---|---|---|---|---|---|---|
| | 1 | 2 | 3 | 4 | 1 | 2 | 3 | 4 | 5 | 6 |
| Highly crystalline polypropylene | 13 | 13 | 13 | 13 | 13 | 13 | 13 | 13 | 13 | 13 |
| Highly crystalline propylene-ethylene copolymer | 49.2 | 49.2 | 49.2 | 47.2 | 55.2 | 43.2 | 49.2 | 49.2 | 55.2 | 49.2 |
| Ethylene-octene elastomer | — | — | — | — | — | — | — | — | — | 23 |
| Ethylene-butene elastomer | 23 | 23 | 23 | 25 | 23 | 23 | 23 | 23 | 17 | 0 |
| Magnesium hydroxide | 14 | 10 | 7 | 14 | 8 | 20 | — | 4 | 14 | 14 |
| Talc | — | 4 | 7 | — | — | — | 14 | 10 | — | — |
| Antioxidant | 0.8 | 0.8 | 0.8 | 0.8 | 0.8 | 0.8 | 0.8 | 0.8 | 0.8 | 0.8 |

Test Example

Specific gravity, tensile strength, flexural modulus, impact strength and paint adhesivity of the polypropylene resin compositions prepared in Examples 1-4 and Comparative Examples 1-6 were tested. If any of these physical properties did not meet the standards for automobile interior trim parts, the sample was evaluated as a "Fail" since deformation may occur during use.

[Evaluation of Physical Properties]

1) Specific Gravity

A test sample for specific gravity measurement was prepared according to ASTM D790 and tested according to ASTM D792. A density meter (Mirage, measurement range: 200 g/0.0001 g) was used.

2) Tensile Strength

Tensile strength was measured according to ASTM D638. Crosshead speed was 50 mm/min A universal testing machine (UTM, Instron) was used.

3) Flexural Modulus

Flexural modulus was measured according to ASTM D790. Crosshead speed was 10 mm/min A UTM (Instron) was used.

4) Impact Strength

Impact strength was measured according to ASTM D256 at room temperature (23° C.). An impact tester (Yasuda) was used.

5) Paint Adhesivity

Paint adhesivity was evaluated by 100×100 cross cut test or peel-off test. After applying modified acrylic paint (Samsung Chemical) or urethane paint (Samsung Chemical) on the injection molded 3-mm thick sheet and drying at 80° C. for 30 minutes, followed by allowing to stand for at least 48 hours at room temperature, 100 squares of lattice pattern (2 mm intervals horizontally and vertically) were formed on the painted surface by knife cutting at right angles. Then, an adhesive tape (cellophane tape) was attached and then pulled off immediately. The number of square grids remaining without being detached was counted and calculated as a percentage to evaluate paintability. If any one of the grids was detached, the sample was evaluated as a "Fail".

The physical property evaluation results for the polypropylene resin compositions prepared in Examples 1-4 and Comparative Examples 1-6 are given in Table 2.

TABLE 2

| | Requirement | Examples | | | | Comparative Examples | | | | | |
|---|---|---|---|---|---|---|---|---|---|---|---|
| | | 1 | 2 | 3 | 4 | 1 | 2 | 3 | 4 | 5 | 6 |
| Specific gravity | ≤0.99 | 0.98 | 0.98 | 0.98 | 0.98 | 0.95 | 1.03 | 0.99 | 0.98 | 0.98 | 0.98 |
| Tensile strength (kgf/cm$^2$) | ≥220 | 231 | 225 | 224 | 221 | 238 | 195 | 214 | 218 | 245 | 225 |
| Flexural modulus (kgf/cm$^2$) | ≥1,800 | 19,746 | 19,123 | 18,621 | 18,092 | 16,090 | 22,100 | 16,790 | 17,460 | 22,520 | 20,125 |
| Impact strength (kgf/cm$^2$) | ≥9 | 39 | 29 | 22 | 46 | 44 | 35 | 21 | 28 | 25 | 41 |
| Paint adhesivity (%) | 100 | 100 | 100 | 100 | 100 | 100 | 100 | 100 | 100 | 85 | 91 |
| Pass or fail | | Pass | Pass | Pass | Pass | Fail | Fail | Fail | Fail | Fail | Fail |

As shown in Table 2, the test samples or sheets prepared using the polypropylene resin compositions of Examples 1-4 exhibited superior specific gravity, rigidity, impact resistance and paint adhesivity that satisfied the physical property requirements. In contrast, those of Comparative Examples 1 and 2 demonstrated poor rigidity owing to improper content of magnesium hydroxide. It seemed that specific gravity increases when the content of magnesium hydroxide exceeds 20 wt %. As for Comparative Examples 3 and 4, wherein the magnesium hydroxide was used in a small amount (Comparative Example 4) or not used at all (Comparative Example 3), the addition of talc resulted in significant decrease of rigidity (i.e., flexural modulus).

As for Comparative Example 5, wherein the content of the ethylene-butene elastomer was improper, paint adhesivity was unsatisfactory.

As for Comparative Example 6, wherein the ethylene-octene elastomer was used, rigidity and impact resistance were superior but paint adhesivity was unsatisfactory.

Accordingly, since the polypropylene resin composition according to the present invention has improved paint adhesivity, painting is possible without using primer treatment. In other words, the polypropylene resin composition can be painted directly onto the surface of the part without applying a primer. Further, since the polypropylene resin composition has improved impact resistance, it provides excellent resistance to damage caused by impact. In addition, the polypropylene resin composition of the present invention it can contribute to weight reduction of the vehicle since it has excellent rigidity and low specific gravity.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A polypropylene resin composition for automobile interior trim parts, comprising:
    about 40-70 wt %, based on the total weight of the polypropylene resin composition, of a base resin comprising a mixture of polypropylene and propylene-ethylene copolymer;
    about 10-18 wt %, based on the total weight of the polypropylene resin composition, of a reinforcer comprising magnesium hydroxide; and
    about 20-42 wt %, based on the total weight of the polypropylene resin composition, of an ethylene-butene elastomer,
    wherein the magnesium hydroxide has an average length of about 1-4 μm and an average thickness of about 0.03-0.1 μm, and
    wherein the reinforcer has a disk-shaped lamellar structure.

2. The polypropylene resin composition for automobile interior trim parts according to claim 1, wherein the polypropylene is highly crystalline with an isotactic index of at least about 97%.

3. The polypropylene resin composition for automobile interior trim parts according to claim 1, wherein the polypropylene has a melt index of about 10-60 g/10 min measured at 230° C. and 2.16 kg.

4. The polypropylene resin composition for automobile interior trim parts according to claim 1, wherein the propylene-ethylene copolymer has an ethylene content of about 2-14 wt % based on the weight of the propylene-ethylene copolymer.

5. The polypropylene resin composition for automobile interior trim parts according to claim 1, wherein the reinforcer is uniformly dispersed in the base resin.

6. The polypropylene resin composition for automobile interior trim parts according to claim 1, wherein the reinforcer further comprises talc.

7. The polypropylene resin composition for automobile interior trim parts according to claim 6, wherein the reinforcer comprises magnesium hydroxide and talc at a weight ratio of about 50-70 wt % magnesium hydroxide to about 30-50 wt % talc.

8. The polypropylene resin composition for automobile interior trim parts according to claim 1, wherein the ethylene-butene elastomer has a melt index of about 0.5-20 g/10 min at 190° C. and 2.16 kg).

9. An automobile interior trim part fabricated using the polypropylene resin composition for automobile interior trim parts according to claim 1.

\* \* \* \* \*